(12) United States Patent
Hayashi (10) Patent No.: US 12,155,873 B2
(45) Date of Patent: Nov. 26, 2024

(54) VIDEO DISTRIBUTION DEVICE, VIDEO DISTRIBUTION METHOD, AND VIDEO DISTRIBUTION PROGRAM

(71) Applicant: DWANGO Co., Ltd., Tokyo (JP)

(72) Inventor: Emiko Hayashi, Tokyo (JP)

(73) Assignee: DWANGO Co., Ltd. (JP)

( * ) Notice: Subject to any disclaimer, the term of this patent is extended or adjusted under 35 U.S.C. 154(b) by 0 days.

(21) Appl. No.: 17/796,247

(22) PCT Filed: Jan. 8, 2021

(86) PCT No.: PCT/JP2021/000524
§ 371 (c)(1),
(2) Date: Jul. 28, 2022

(87) PCT Pub. No.: WO2021/199559
PCT Pub. Date: Oct. 7, 2021

(65) Prior Publication Data
US 2023/0074478 A1 Mar. 9, 2023

(30) Foreign Application Priority Data

Mar. 30, 2020 (JP) ................................ 2020-059479

(51) Int. Cl.
*G06F 15/16* (2006.01)
*H04N 21/2187* (2011.01)
(Continued)

(52) U.S. Cl.
CPC ....... *H04N 21/238* (2013.01); *H04N 21/2187* (2013.01); *H04N 21/25891* (2013.01)

(58) Field of Classification Search
None
See application file for complete search history.

(56) References Cited

U.S. PATENT DOCUMENTS 5,956,716 A * 9/1999 Kenner ................ H04N 21/222
7,650,376 B1 * 1/2010 Blumenau ........... H04L 67/1008
709/217

(Continued)

FOREIGN PATENT DOCUMENTS

CN 102802079 A 11/2012
CN 109495765 A 3/2019
(Continued)

OTHER PUBLICATIONS

PCT/JP2021/000524 International Search Report dated Mar. 16, 2021, 3 pgs.
(Continued)

*Primary Examiner* — Phuoc H Nguyen
(74) *Attorney, Agent, or Firm* — Bracewell LLP; Doug F. Stewart; Patrick J. Connolly (57) ABSTRACT

It is an object of the present invention to display a list of trimmed portions of exciting live video content to a viewer who is in the process of selecting a video in order to make it easier for the viewer to select live broadcast video. A video distributing device in an embodiment of the present invention comprises: a first acquiring unit that acquires real-time video data; a second acquiring unit that acquires inputted information supplied from a viewer terminal; a generating unit that generates video data for distribution based on real-time video data and inputted information; a determining unit that determines whether or not video data for distribution is exciting based on inputted information; a trimming unit that generates video data by trimming portions of video data for distribution including timing determined to be exciting by the determining unit; a list generating unit that generates list data combining a plurality of sets of video data generated by the trimming unit; and a list distributing unit that distributes list data.

6 Claims, 7 Drawing Sheets

(51) Int. Cl.
*H04N 21/238* (2011.01)
*H04N 21/258* (2011.01)

(56) References Cited

U.S. PATENT DOCUMENTS

| | | | | |
|---|---|---|---|---|
| 8,169,916 | B1* | 5/2012 | Pai | H04N 21/2181 709/200 |
| 2004/0025178 | A1* | 2/2004 | Gordon | H04N 21/6547 725/135 |
| 2010/0281178 | A1* | 11/2010 | Sullivan | H04B 7/00 709/245 |
| 2013/0179588 | A1* | 7/2013 | McCarthy | H04N 21/2381 709/231 |
| 2016/0241891 | A1* | 8/2016 | Ninomiya | H04N 21/440263 |
| 2016/0269759 | A1* | 9/2016 | Watanabe | H04N 21/4858 |
| 2016/0337426 | A1* | 11/2016 | Shribman | H04N 21/6125 |
| 2019/0028743 | A1* | 1/2019 | He | H04N 21/2225 |
| 2022/0279249 | A1* | 9/2022 | Kitada | H04N 21/23805 |

FOREIGN PATENT DOCUMENTS

| | | |
|---|---|---|
| JP | 2010226630 A | 10/2010 |
| JP | 2012049875 A | 3/2012 |
| JP | 2013192062 A | 9/2013 |
| JP | 2015186003 A | 10/2015 |
| JP | 2018085754 A | 5/2018 |
| JP | 6426257 B1 | 11/2018 |
| JP | 6434106 B1 | 12/2018 |
| JP | 2019164617 A | 9/2019 |
| JP | 2019169891 A | 10/2019 |

OTHER PUBLICATIONS

CN202180010417.4 Office Action dated May 24, 2023, 23 pgs.
JP2020133977 Notice of Reasons for Refusal dated Jan. 9, 2024, 8 pgs.
CN202180010417.4 Office Action dated Oct. 31, 2023, 28pgs.

* cited by examiner

VIDEO DISTRIBUTION DEVICE, VIDEO DISTRIBUTION METHOD, AND VIDEO DISTRIBUTION PROGRAM

TECHNICAL FIELD

The present invention relates to a video distributing device, a video distributing method, and a video distribution program.

BACKGROUND ART

It has become possible in recent years to distribute video taken with mobile terminals such as smartphones and video displaying objects in virtual space.

A technique has been proposed that notifies viewers who are following live content when live content they are following has become exciting. For example, in Patent Document 1, live content is distributed by a live content distributing device 121 to viewer terminals 131 via a content distributing server 111 from the start to the end of distribution, and notification is provided during playback of content they are following when the threshold for determining whether or not the content is exciting has been exceeded (see paragraph of Patent Document 1). User information posted from viewer terminal 131s is also associated with live content, and may include graphics such as icons or stamps and audio data in addition to text comments in the form of quips or impressions of the content (see paragraph [0071] of Patent Document 1).

CITATION LIST

Patent Literature

Patent Document 1: JP 6434106 B2

SUMMARY OF INVENTION

Technical Problem

This prior art technique can be used to encourage viewers to keep watching live content they are following. It can also be used to help viewers search for interesting live broadcasts by looking up information on, for example, the popularity of distributors and live broadcast genres.

It can be difficult to determine in advance whether or not a live video broadcast is interesting based on information such as the title of a live broadcast and its distributor. When a viewer selects a live broadcast and watches it for a while only to discover that it's not very interesting, the viewer may stop watching even though there are points in time in the video before and after the watched portion that were or will be exciting. If this experience occurs repeatedly, the viewer will not be able to put together a favorites list of live broadcasts and enjoys live broadcasts that are available.

In light of these circumstances, it is an object of the present invention to display a list of trimmed portions of exciting live video content to a viewer who is in the process of selecting a video in order to make it easier for the viewer to select live broadcast video.

Solution to Problem

A first aspect of the present invention is a video distributing device in an embodiment of the present invention comprises: a first acquiring unit that acquires real-time video data supplied from a distributor terminal; a second acquiring unit that acquires inputted information supplied from a viewer terminal; a generating unit that generates video data for distribution based on real-time video data and inputted information; a determining unit that determines whether or not video data for distribution is exciting based on inputted information; a trimming unit that generates video data by trimming portions of video data for distribution including timing determined to be exciting by the determining unit; a list generating unit that generates list data combining a plurality of sets of real-time video data generated by the trimming unit; and a list distributing unit that distributes the real-time list data.

A second aspect of the present invention is a video distributing device according to the first aspect, wherein the determining unit determines that video content based on the video data for distribution is exciting when the number of times inputted information is supplied from viewer terminals that view the video content is equal to or greater than a predetermined threshold value. A third aspect of the present invention is a video distributing device according to the first aspect, wherein the determining unit determines that video content based on the video data for distribution is exciting when the number of viewer terminals that view the video content is equal to or greater than a predetermined threshold value.

A fourth aspect of the present invention is a video distributing device according to any one of the first to third embodiments, wherein the trimmed video data includes at least one set of frame video data before and after the point in time at which video content was determined to be exciting by the determining unit. A fifth aspect of the present invention is a video distributing device according to any one of the first to fourth embodiments, further comprising a third acquiring unit that acquires selection information for selecting video data included in the real-time video list data from the viewer terminal that views the listed video content based on the real-time video list data, wherein the distributing unit distributes the original video data for distribution in the selected video data based on the selection information to the video terminal that selected the video data included in the real-time video list data.

A sixth aspect of the present invention is a video distributing device according to any one of the first to fifth embodiments, further comprising a distribution control unit that sets selection criteria for cruise destinations for a viewer terminal that requests use of a cruise service, and a destination determining unit that determines video data for destinations based on the selection criteria from a plurality of sets of video data included in the real-time video list data, wherein the list distributing unit distributes the video data for destinations in successive order.

A seventh aspect of the present invention is a video distributing device according to any one of the first to sixth embodiments, wherein the video data included in the real-time video list data may include information on the sampling time and the end time, and the list generating unit generates a list sorted so as to give a lower priority to video data whose sampling time and end time have already passed. A eighth aspect of the present invention is a video distributing method for a video distributing device comprising a first acquiring unit that acquires real-time video data supplied from a distributor terminal, a second acquiring unit that acquires inputted information supplied from a viewer terminal, a generating unit that generates video data for distribution based on real-time video data and inputted information, and a distributing unit that distributes the video data for distribution, the video distributing method comprising: determining whether or not the video data for distribution is exciting based on the inputted information; generating video data by trimming portions of the video data for distribution including a point in time determined to be exciting; generating real-time video list data by combining a plurality of sets of trimmed video data; and distributing the real-time video list data.

A ninth aspect of the present invention is a video distribution program causing a computer capable of functioning as a first acquiring means for acquiring real-time video data supplied from a distributor terminal, a second acquiring means for acquiring inputted information supplied from a viewer terminal, a generating means for generating video data for distribution based on real-time video data and inputted information, and a distributing means for distributing the video data for distribution, to function as a determining means for determining whether or not the video data for distribution is exciting based on the inputted information; a trimming means for generating video data by trimming portions of the video data for distribution including a point in time determined to be exciting; a list generating means for generating real-time video list data by combining a plurality of sets of trimmed video data; and a list distributing means for distributing the real-time video list data.

Effects of Invention

The present invention can present a list of trimmed portions of exciting live video content to a viewer who is in the process of selecting a video in order to make it easier for the viewer to select live broadcast video.

DESCRIPTION OF EMBODIMENTS

Figure 1:
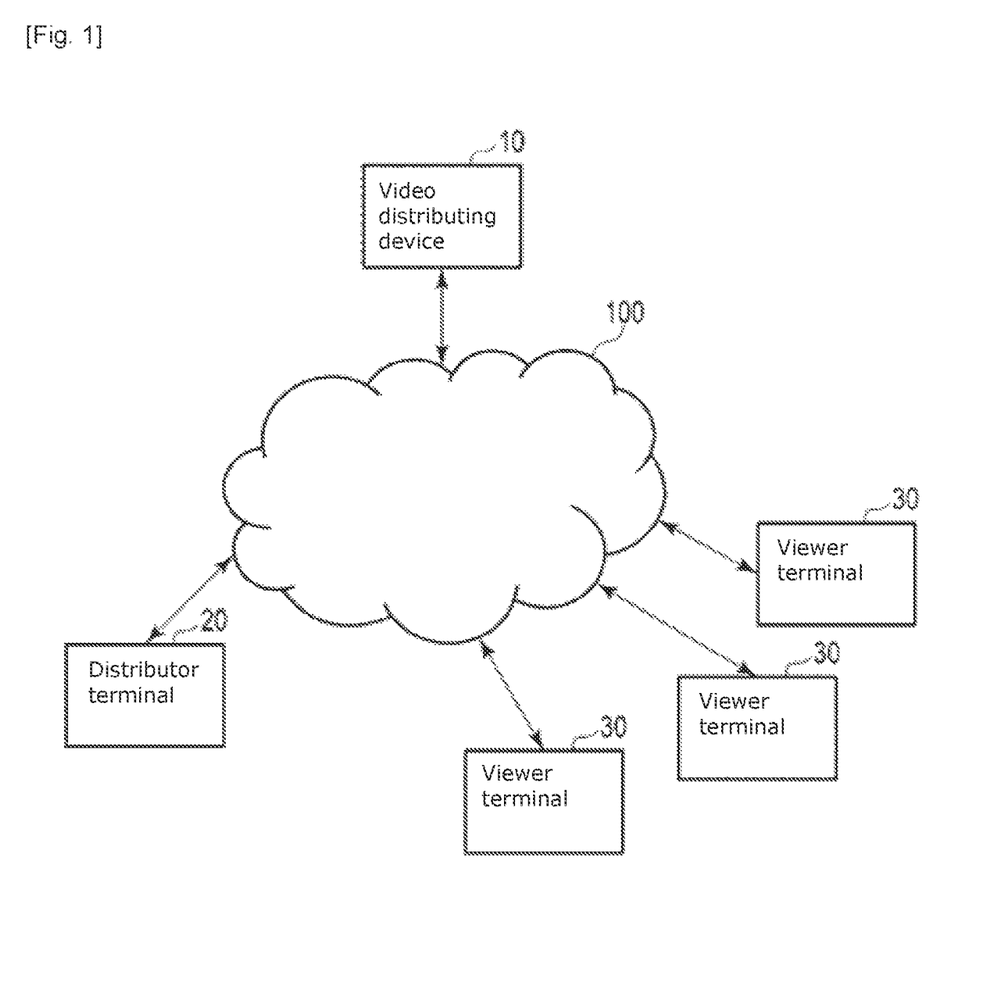
FIG. 1 is a diagram schematically illustrating the configuration of a video distribution system including the video distribution device in a first embodiment.

The following is a detailed description of the video distributing devices, video distributing method, and video distribution program in embodiments of the present invention with reference to the drawings. FIG. 1 is a diagram schematically illustrating the configuration of a video distribution system including the video distribution device in a first embodiment.

The video distribution system includes a distributor terminal 20 and a video distributing device 10. The video distributing device 10 can be connected to the distributor terminal 20 and viewer terminal 30 via the network 100. Although three viewer terminals 30 are shown in FIG. 1, the number of viewer terminals 30 is not limited to the number shown in the drawing, and may even be zero.

There are no particular restrictions on the distributor terminal 20, which can be any electronic device such as computers that can connect to a video source such as a video camera. Examples include television receivers (including internet televisions), personal computers (PCs), mobile terminals (such as tablets, smartphones, laptops, feature phones, portable game consoles, digital music players, and e-book readers), virtual reality (VR) terminals, and augmented reality (AR) terminals. The distributor terminal 20 includes, for example, at least one processor and storage unit in which a program executed by the processor is stored, and can be configured to realize various functions by using software or a combination of software and hardware.

There are no particular restrictions on the viewer terminals 30, which can be television receivers (including internet televisions), personal computers (PCs), mobile terminals (such as tablets, smartphones, laptops, feature phones, portable game consoles, digital music players, and e-book readers), virtual reality (VR) terminals, and augmented reality (AR) terminals.

Each viewer terminal 30 includes, for example, at least one processor and storage unit in which a program executed by the processor is stored, and can be configured to realize various functions by using software or a combination of software and hardware.

A viewer terminal 30 can receive content data such as video data and real-time video list data from the video distributing device 10 and present the content to the viewer via a display means or an audio means (not shown).

Figure 2:
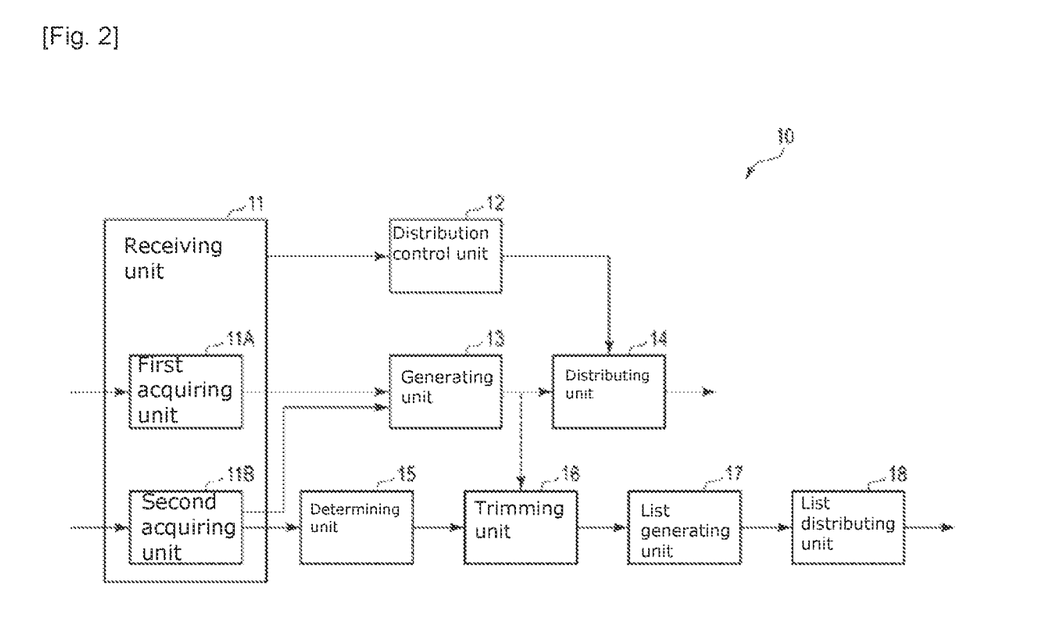
FIG. 2 is a diagram schematically illustrating the configuration of the video distribution device in the first embodiment.

FIG. 2 is a diagram schematically illustrating the configuration of the video distribution device in the first embodiment. The video distributing device 10 includes, for example, a processor that executes a program to realize the functions in the configuration described above, and a memory that stores the program executed by the processor, and can be configured to realize various functions by using software or a combination of software and hardware.

The processor is typically a central processing unit (CPU) and/or a graphics processing unit (GPU), but may be a microcomputer, a field programmable gate array (FPGA), or a digital signal processor (DSP). The memory can also temporarily store a program executed by the processor and data used by the processor to realize operations performed by the video distributing device 10. The program executed by the processor may be recorded on a computer-readable recording medium and supplied to the video distributing device 10 via the recording medium.

The video distributing device 10 is provided with a receiving unit 11 including a first acquiring unit 11A and a second acquiring unit 11B, a generating unit 13, a distributing unit 14, a distribution control unit 12, a determining unit 15, a trimming unit 16, a list generating unit 17, and a list distributing unit 18.

The video distributing device 10 may also be provided with a communication unit (not shown) that can connect to a network, and a data storage unit (not shown) for storing a large amount of data. The data storage unit can be built into the video distributing device 10 or may be an external unit connected to the video distributing device 10. The data storage unit may include, for example, a non-volatile storage medium such as a hard disk drive (HDD) or a solid state drive (SSD).

The receiving unit 11 can communicate with the distributor terminal 20 and the viewer terminals 30 via the network 100, and may include a first acquiring unit 11A and a second acquiring unit 11B. For example, the receiving unit 11 can receive video data from the distributor terminal 20 and distribution requests from viewer terminals 30. The receiving unit 11 transmits distribution requests received from viewer terminals 30 to the distribution control unit 12.

The first acquiring unit 11A can receive real-time video data transmitted sequentially from the distributor terminal 20 via the network 100. Specifically, the first acquiring unit 11A receives video data for real-time distribution from the distributor terminal 20. The real-time video data may be video data captured by a camera, motion data on an avatar and or object data constituting a virtual space, or any combination of these. The first acquiring unit 11A sends the received video data to the generating unit 13.

The second acquiring unit 11B can receive inputted information from viewer terminals 30 corresponding to video data for real-time distribution. Specifically, inputted information received by the second acquiring unit 11B from viewer terminals 30 is information based on operations performed by viewers using the viewer terminals 30, and can include identification information related to the video data being viewed on viewer terminals 30, image information such as comments posted by views and posting time stamps, and time information on operations performed by viewers. The second acquiring unit 11B sends received inputted information to the generating unit 13 and the determining unit 15.

The distribution control unit 12 controls the real-time distribution of video data for distribution and the distribution of real-time video list data. The delivery control unit 12 can include a clock (not shown), and the time information obtained from the clock can be compared with the time frames assigned to the real-time distribution of video data for distribution to manage the start and end of real-time distribution of the video data for distribution. The distribution control unit 12 can start the distribution of real-time video content when video data for distribution is received, and manage the start and end of real-time distribution so that the distribution of real-time video content ends when the video data for distribution ends. The distribution control unit 12 also controls the distributing unit 14 and the list distributing unit 18 so that distribution requests from viewer terminals 30 are received by the receiving unit 11 and distribution video data or real-time video list data is distributed to the viewer terminals 30.

The generating unit 13 receives real-time video data from the first acquiring unit 11A, and receives inputted information by viewers from the second acquiring unit 11B. The generating unit 13 can then generate video data for distribution based on the real-time video data and the inputted information. For example, the generating unit 13 can generate video data for distribution by superimposing inputted information on real-time video data. The generating unit 13 may synthesize inputted information with real-time video data by using any well-known technique such as the alpha blending or picture-in-picture technique. The generating unit 13 then sends the generated video data for distribution to the distributing unit 14 and the trimming unit 16.

For example, the generating unit 13 can resize a portion of the screen or the entire screen for playback of the real-time video data, or trim some of the display screen for the real-time video data to generate video data for distribution. The generating unit 13 may superimpose resisted or trimmed video and inputted information in a portion of the screen, or synthesize inputted data so that a portion of the screen for playback of real-time video data is exposed and another portion is hidden. Also, in order to be able to switch between and distribute a plurality of sets of video data for distribution in response to a distribution request from a viewer terminal 30, the generating unit 13 may generate a plurality of sets of video data for distribution with different video data to be displayed from a single set of real-time video data and transmit the data to the distributing unit 14.

The distributing unit 14 is connected to the network, receives video data for distribution from the generating unit 13, and distributes the video data for distribution to viewer terminals 30 from which a distribution request has been received. The distributing unit 14 can also control, for example, the destination of video data for distribution using the distribution control unit 12. The distributing unit 14 may discard video data for distribution immediately after distribution or may, for example, buffer the video data for distribution for a predetermined period of time to allow for replay or slow motion playback.

The determining unit 15 determines whether or not there is a point in time at which the video data for distribution is exciting based on inputted information received from the second acquiring unit 11B. For example, the determining unit may determine that video content in the video data for distribution is exciting when the number of viewer terminals 30 watching the video content, the rate of increase in viewer terminals 30 viewing video content per unit of time, or the number of viewer terminals 30 used to send inputted information is equal to or greater than a threshold value. It can also determine that video content in the video data for distribution is exciting when the type and number of images such as time stamps or the number of times certain words have been used in inputted comments is equal to or greater than a threshold value. For example, the determining unit 15 may determine that video content in the video data for distribution is exciting based on the ratio of the display area for inputted information displayed on the screen relative to the total area of the screen.

When the determining unit 15 has determined that there is a point in time at which the video data for distribution is exciting the identifier for the video data for distribution and the point in time at which it was determined that the video content is exciting are sent to the trimming unit 16. Note that the point in time determined to be exciting may be determined based on, for example, time information included in inputted information, date and time information, or the start and end times of the content that is exciting. The determining unit 15 may also buffer inputted information for a predetermined period of time. In this case, the determining unit 15 can determine whether or not real-time video is exciting at predetermined intervals of time based on the inputted information that has been buffered.

The trimming unit 16 can buffer video data for distribution supplied from the generating unit 13 for a predetermined period of time. The trimming unit 16 selects video data for distribution supplied from the generating unit 13 based on the identifiers in real-time video supplied from the determining unit 15, and video data is generated by trimming the video data for distribution so that predetermined playback times include at least points in time with exciting content. Points in time with exciting content are determined based on inputted information from viewer terminals 30 based on the thought that exciting portions of the video data for distribution that generate interest occur immediately beforehand. In order to include interesting portions of video data after trimming, the trimming unit 16 may perform trimming from a certain amount time before the point in time at which the excitement starts to the point in time at which the excitement ends. The trimming unit 16 outputs the generated video data to the list generating unit 17.

The trimming unit 16, for example, selects video data for distribution supplied by the generating unit 13 based on identifiers for the real-time video supplied by the determining unit 15, and includes at least one frame of video data before and after the point in time at which video content was determined to be exciting to provide a snapshot. For example, by selecting a plurality of sets of frame video at a predetermined time interval from the beginning of the video data for distribution for inclusion in the trimmed video data, viewers who are interested in the content of the original video data for distribution based on the trimmed video data can select the video content they want to watch by using the plurality of sets of frame video as a reference point in the content of the original video data for distribution.

The list generating unit 17 can, for example, generate real-time video list data including a plurality of sets of video data supplied by the trimming unit 16 and send the real-time video list data to the list distributing unit 18. The real-time video list data may be configured by combining some of a plurality of sets of video data for distribution, or may be configured by combining a plurality of portions in a single set of video data for distribution. The list generating unit 17 may also select video data to be included in the real-time video list data based on, for example, the genre of the original video data for distribution (the video data distribution before trimming) and the degree of excitement.

For example, the list generating unit 17 may generate real-time video list data by prioritizing trimmed video (a portion of the video data for distribution) based on the time lag from the time at which the video data for distribution that is the source of the trimming was distributed to the current time and the degree of excitement. The list generating unit 17 can update the real-time video list data on a predetermined cycle and send the generated real-time video list data to the list distributing unit 18.

The list distributing unit 18 is connected to the network, receives real-time video list data for distribution from the list generating unit 17, and distributes the list data to viewer terminals 30 from which a distribution request has been received. The list distributing unit 18 controls, for example, the destination of real-time video list data using the distribution control unit 12. The video data included in the distributed real-time video list data may be played back sequentially or concurrently on a viewer terminal 30. For example, video data included in real-time video list data may be previewed sequentially or concurrently in a list displaying region provided in the region surrounding the display screen on which video content is being watched, or video data included in the real-time moving image list data may be displayed side by side from the upper portion to the lower portion of the screen in a predetermined order. The playback order and arrangement of video data included in the real-time video list data may be based on the degree of excitement or the shortest time lag between the points in time at which there is excitement and the playback time. At this time, information such as the genre of the original video data for distribution, the distributor, the current number of viewers, the deadline for removal from the service, the distribution end time, and the time remaining until the distribution end time may be displayed near the video display screen.

The list distributing unit 18 may discard video data for distribution immediately after distribution or may, for example, buffer the video data for distribution for a predetermined period of time to allow for replay or slow motion playback. Note that the video distributing device 10 in the present embodiment can perform real-time distribution of video data and distribution of real-time video list data concurrently.

Figure 3:
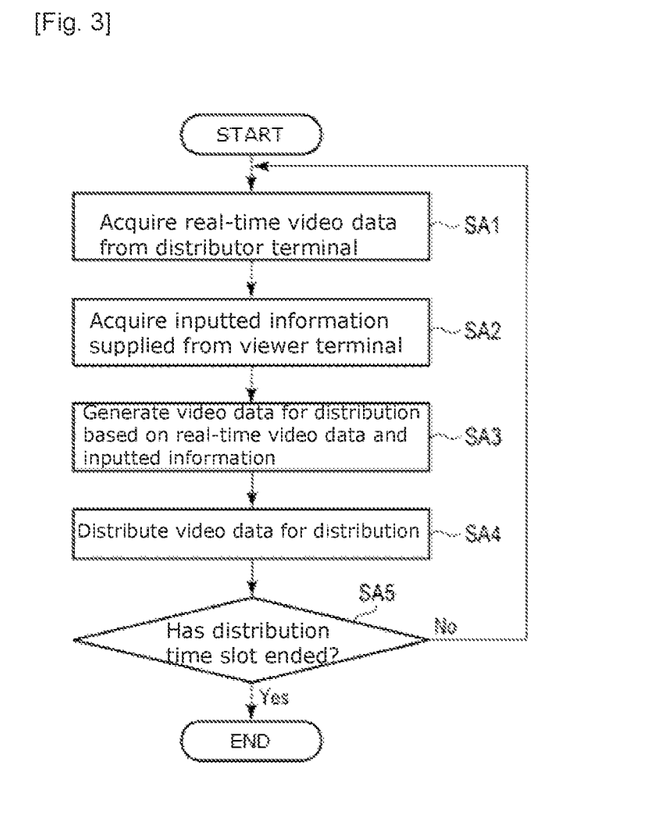
FIG. 3 is a flowchart used to explain an example of operations performed by the video distribution device in the first embodiment to distribute video data for distribution.

The following is an explanation of an example of operations performed by the video distributing device 10 in the present embodiment. FIG. 3 is a flowchart used to explain an example of operations performed by the video distribution device in the first embodiment to distribute video data for distribution. The video distributing device 10 acquires real-time video data from the distributor terminal 20 via the first acquiring unit 11A (step SA1). Note that the first acquiring unit 11A receives real-time video data transmitted by the distributor terminal 20 continuously until the end. The first acquiring unit 11A can also acquire a plurality of sets of real-time video data concurrently.

The video distributing device 10 also acquires inputted information from viewer terminals 30 via the second acquiring unit 11B (step SA2). The inputted information may include, for example, the inputted content, date and time information, and real-time video identification information. The second acquiring unit 11B can acquire inputted information each time information inputted based on an operation performed on a viewer terminal 30 is sent.

The real-time video data acquired by the first acquiring unit 11A and the inputted information acquired by the second acquiring unit 11B are supplied to the generating unit 13. The generating unit 13 generates video data for distribution using real-time video data and inputted information (step SA3). The generated video data for distribution is supplied to the distributing unit 14 and the trimming unit 16.

The distributing unit 14 distributes video data for distribution to viewer terminals 30 that requested the video data based on control signals from the distribution control unit 12 (step SA4). The distribution control unit 12 determines whether or not the distribution time slot has ended (or whether or not the reception of real-time video data has ended) (step SA5). Steps SA1 to SA4 are repeated to distribute video data for distribution until the distribution time slot is over (or reception of real-time video data has ended).

Figure 4:
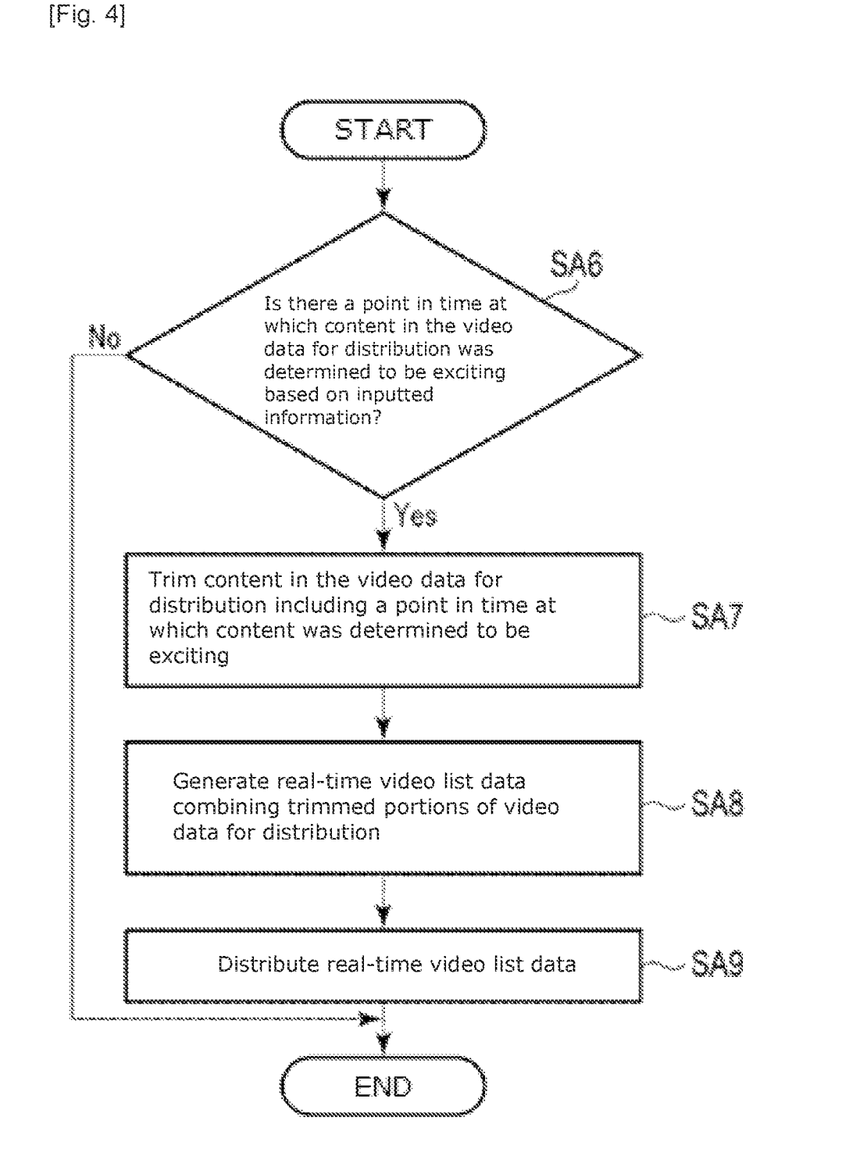
FIG. 4 is a flowchart used to explain an example of operations performed by the video distribution device in the first embodiment to distribute real-time video list data.

FIG. 4 is a flowchart used to explain an example of operations performed by the video distribution device in the first embodiment to distribute real-time video list data. The determining unit 15 acquires inputted information from the second acquiring unit 11B, and determine whether or not there are points in time with excitement in the video data for distribution based on the inputted information (step SA6). Note that step SA6 to step SA9 can be performed concurrently with the distribution of video data for distribution in steps SA1 to SA4.

When it has been determined based on the inputted information that there are no points in time with excitement in the video data for distribution, the real-time video list data generating process ends. When it has been determined there are points in time with excitement in the video data for distribution, the determining unit 15 supplies time information for the points in time determined to be exciting and identification information for identifying the video data for distribution (or real-time video data) to the trimming unit 16.

The trimming unit 16 trims portions of video data for distribution including the points in time determined to be exciting. Note that when a point in time determined to be exciting extends over a predetermined period of time, the trimming unit 16 can trim a portion of the video data for distribution including the predetermined period of time determined to be exciting (step SA7).

The list generating unit 17 generates real-time video list data combining the portion the video data for distribution generated by the trimming unit 16 (step SA8). The list generating unit 17 can generate a plurality of sets of real-time video list data based on, for example, the genre of the video data for distribution and the degree of excitement. For example, the list generating unit 17 may create real-time video list data for sequentially playing portions of video data for distribution in a common genre or from a certain distributor. Real-time video list data may also be created in which portions of video data for distribution with a high degree of excitement (based, for example, on the number of inputted comments or the increase in the number of viewer terminals 30 being equal to or greater than a predetermined threshold value) is played back in successive order.

The list distributing unit 18 distributes real-time video list data to viewer terminals 30 that has requested the distribution of real-time video list data based on control signals from the distribution control unit 12 (step SA9).

As mentioned above, the video distributing device 10, the video distributing method, and the video distribution program in the present embodiment can distribute real-time video list data focused on exciting portions of video being broadcast live so that viewers can search for interesting live video to select by referring to video content listed in the real-time video list data.

In other words, the present embodiment is able to present a list obtained by trimming exciting portions of video during live broadcasting to viewers currently in the process of selecting video to watch so that the viewer can more easily select live broadcast video.

Figure 5:
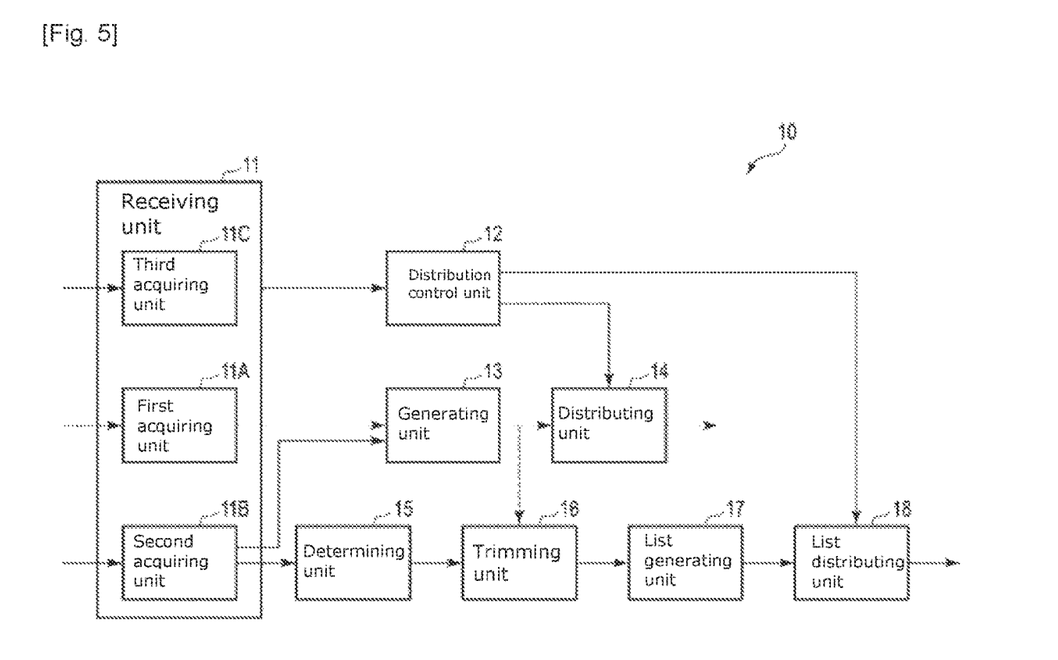
FIG. 5 is a diagram schematically illustrating the configuration of the video distribution device in a second embodiment.

The following is a detailed description of the video distributing device, the video distributing method, and the video distribution program in a second embodiment of the present invention with reference to the drawings. FIG. 5 is a diagram schematically illustrating the configuration of the video distribution device in the second embodiment. When a viewer terminal 30 viewing video content listed in real-time video list data selects video content included in the listed video content, the video distributing device 10 in the present embodiment induces the user to watch the original live broadcast of the selected video content (viewing the video content from the middle or playing back the video content).

The receiving unit 11 in the video distributing device 10 of the present embodiment includes a third acquiring unit 11C. The third acquiring unit 11C acquires selection information for selecting video data included in the real-time video list data from a viewer terminal 30 viewing the list of video content in the real-time video list data. The selection information is a request to distribute the video data for distribution that is the origin of the selected video data, and includes information identifying the original video data for distribution (distributor identifying information, distribution time slot identifying information, etc.) and information that identifies the selecting viewer terminal 30 (for example, viewer terminal 30 identifying information). The third acquiring unit 11C supplies the acquired selection information to the distribution control unit 12.

The distribution control unit 12 controls the distributing unit 14 based on the selection information from the third acquiring unit 11C, and distributes the original video data for distribution to the viewer terminal 30 that selected video data included in the real-time video list data. Note that the distribution control unit 12 may, for example, control the distributing unit 14 and the list distributing unit 18 to start distribution of the original video data for distribution after trimmed video data has been viewed on the viewer terminal 30 used to select the trimmed video data.

The distribution control unit 12 may also, for example, control the list distributing unit 18 to display the original video data for distribution in picture-in-a-picture mode in the portion of the screen displaying the trimmed video data on the viewer terminal 30 used to select the trimmed video data so that the viewer can switch between viewing the trimmed video data and the original video data for distribution. Note that the list generating unit 17 can receive the original video data for distribution and the trimmed video data from the trimming unit 16, and generate data for displaying the original video data for distribution and data for displaying the trimmed video data in a portion of the original video data for distribution.

The distribution control unit 12 may also, for example, control the distributing unit 14 and the list distributing unit 18 to receive the original video data for distribution at the end of the trimmed video data after the trimmed video data has been viewed on the viewer terminal 30 used to select the trimmed video data. In this case, the playback speed of the original video data for distribution can be adjusted on the viewer terminal 30, the playback speed of the original distribution video data distributed by the distributing unit 14 can be adjusted by distribution control unit 12 based on playback speed information obtained from the receiving unit 11. For example, when the original distribution video data played on the viewer terminal 30 has caught up with the playback time of the current live broadcast, the distribution control unit 12 switches to distribution of live video data for distribution.

The video distributing device 10 in the present embodiment can be operated so that when, for example, the distribution control unit 12 receives selection information from the third acquiring unit 11C, control signals can be sent from the distribution control unit 12 to the distributing unit 14 in step SA4 shown in FIG. 3 to distribute the video data for distribution that is the source of the selected video data to the predetermined viewer terminal 30. The distributing unit 14 then distributes the original video data for distribution to the predetermined viewer terminal 30 based on the control signals from the distribution control unit 12.

In other words, the video distributing device 10, the video distributing method, and the video distribution program in the present embodiment enables viewers to find interesting video by referring to video content in the real-time video list data, and request distribution of the original video data for distribution by selecting video on the list.

In this way, the present embodiment can present a list of trimmed portions of exciting live video content to a viewer who is in the process of selecting a video in order to make it easier for the viewer to select live broadcast video.

The following is a detailed description of the video distributing device, the video distributing method, and the video distribution program in a third embodiment of the present invention with reference to the drawings. The video distributing device 10 in the present embodiment is able to provide a cruise service to viewer terminals 30. This cruise service, for example, enables viewers to watch a plurality of sets of live video data one after the other over a predetermined time cycle. Here, the live video data may be determined by the service provider. Viewers using the cruise service can choose to move on to the next set of live video data or stay with the current live video data ("disembark"). By using this cruise service, viewers do not have to actively search for live video content, and this reduces the burden on viewers. The distributor is given the opportunity to have a large number of viewers watch its live video content, and can be expected to acquire new viewers.

Figure 6:
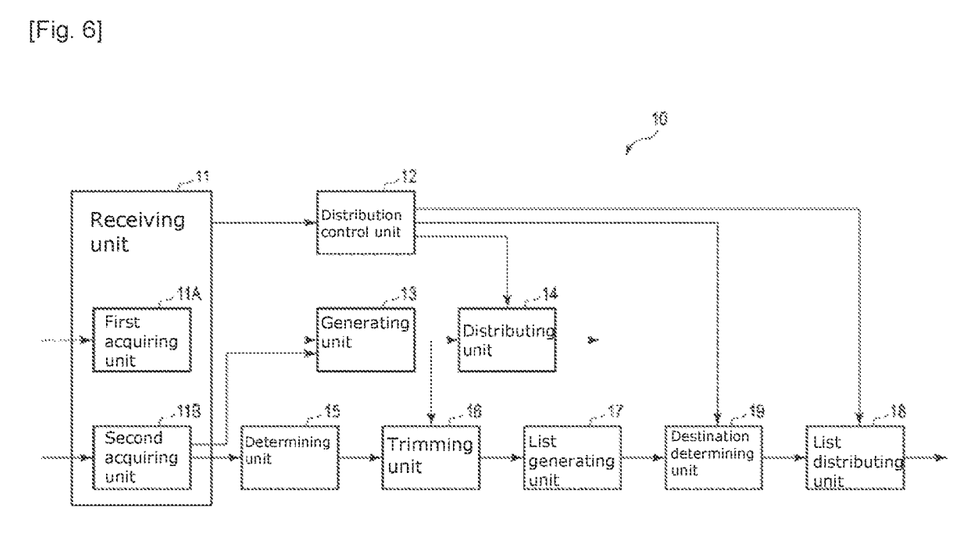
FIG. 6 is a diagram schematically illustrating the configuration of the video distribution device in a third embodiment.

FIG. 6 is a diagram schematically illustrating the configuration of the video distribution device in a third embodiment. The video distributing device 10 of the present embodiment also includes a destination determining unit 19. In the video distributing device 10 of the present embodiment, the list generating unit 17 uses, for example, a plurality of videos supplied from the trimming unit 16 as cruise destination candidate data. The list generating unit 17 may use, for example, only some of the plurality of sets of video data (for example, high-priority data) supplied from the trimming unit 16 as cruise destination candidate data.

The destination determining unit 19 receives destination candidate data from the list generating unit 17. The destination determining unit 19 can, for example, determine destinations according to genre information on the real-time video data (or video data for distribution) or priorities, etc. based on control signals (selection criterion) from the distribution control unit 12, and send the video data on destinations to the list distributing unit 18.

The distribution control unit 12 can set selection criteria for determining destinations for the cruise service based on, for example, the playback time (minimum time or maximum time) for destination video data, the time required for the entire cruise (minimum time or maximum time), information inputted from the viewer terminal 30 using the cruise service, identification information for the viewer terminal 30, or the past viewing history by the viewer terminal 30, and send control signals to the destination determining unit 19. The distribution control unit 12 sets selection criteria for determining destinations in the cruise service, and sends the control signals to the destination determining unit 19. The destination determining unit 19 can also randomly set destinations. In this case, the distribution control unit 12 outputs control signals to the destination determining unit 19 so that destinations are randomly determined.

The list distributing unit 18 generates real-time video list data from the destination video data supplied by the destination determining unit 19, and distributes the destination video data to the viewer terminal 30 using the cruise service so that the viewer can browse through the destination video data.

Figure 7:
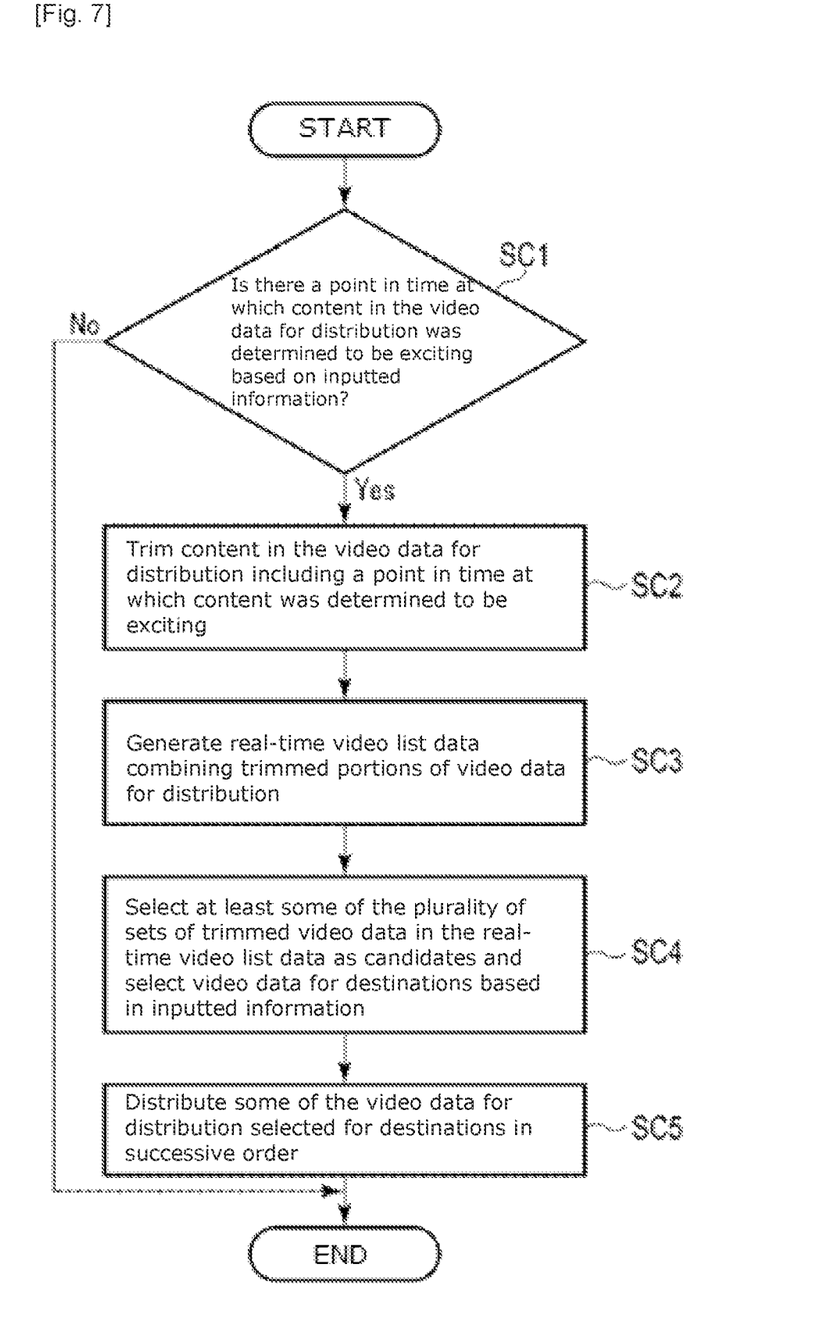
FIG. 7 is a flowchart used to explain an example of operations performed by the video distribution device in the third embodiment to provide a cruise service.

The following is an explanation of the operations performed by the video distributing device 10 in the present embodiment. FIG. 7 is a flowchart used to explain an example of operations performed by the video distribution device in the third embodiment to provide a cruise service. Because steps SC1 to SC3 shown in FIG. 7 are the same as steps SA6 to SA8 shown in FIG. 4, a redundant explanation of these steps has been omitted.

The destination determining unit 19 sets some of the plurality of sets of trimmed video data included in the real-time video list data supplied by the list generating unit 17 as destination candidates. For example, the destination video data is determined based on control signals supplied by the distribution control unit 12 (step SC4).

The list distributing unit 18 distributes in successive order destination video data supplied from the destination determining unit 19 to the viewer terminal 30 using the cruise service based on control signals from the distribution control unit 12 (step SC5).

A viewer who is using the cruise service can request distribution of the video data for distribution that is the origin of trimmed video data as explained in, for example, the second embodiment, by selecting the video content being watched. In this way, the video distributing device 10, the video distributing method, and the video distribution program in the present embodiment enables viewers using the cruise service to find interesting video by referring to trimmed video data for determining a destination.

In this way, the present embodiment can present a list of trimmed portions of exciting live video content to a viewer who is in the process of selecting a video in order to make it easier for the viewer to select live broadcast video.

The invention of the present application is not limited to the embodiments described above. Other variations are possible without departing from the spirit and scope of the invention in each stage of the embodiment process. The embodiments may be carried out in combination and a combined effect may be obtained. Various inventions are included in the embodiments described above and various inventions can be derived from the appropriate combination of the disclosed configurational elements. The problem can be solved even when any of the configurational elements described in the embodiments has been eliminated, and any configuration eliminating these configurational elements can be used to derive the invention if the effects of the invention are obtained.

The list distributing unit 18 may also notify viewers on a preset list of generated real-time moving image list data based on control signals from the distribution control unit 12. For example, the distribution control unit 12 can have the list distributing unit 18 notify certain accounts in a preset social networking service (SNS) of the availability of real-time video list data. By checking notifications in their SNS account, viewers can find interesting video content to view without having to check a video distribution site. A trigger may be set for notification of real-time video list data by each account holder. For example, a trigger can be set to notify an account holder of real-time video list data including video data with a high degree of excitement, or a trigger may be set to periodically notify an account holder of real-time video list data at a given time on a given day of the week.

The video data included in the real-time video list data may include information on the deadline for removal from the service or the distribution end time. For example, video data may be sorted so that video data whose removal time or distribution end time has already passed is given a lower priority. In each case, the same effects as those of the embodiments described above can be obtained.

REFERENCE SIGNS LIST

10: Video distributing device
11: Receiving unit
11A: First acquiring unit
11B: Second acquiring unit
11C: Third acquiring unit
12: Distribution control unit
13: Generating unit
14: Distributing unit
15: Determining unit
16: Trimming unit
17: List generating unit
18: List distributing unit
19: Destination determining unit
20: Distributor terminal 30: Viewer terminal
100: Network

The invention claimed is:

1. A video distributing device comprising:
a first acquiring unit configured to acquire real-time video data supplied from a distributor terminal;
a second acquiring unit configured to acquire inputted information supplied from a viewer terminal;
a generating unit configured to generate video data for distribution based on real-time video data and inputted information;
a determining unit configured to determine whether or not the video data for distribution is exciting based on inputted information;
a trimming unit configured to generate a plurality of sets of real-time video data by trimming portions of the video data for distribution in order to include a portion of the video data at a timing determined to be exciting by the determining unit and exclude other portions of the video data;
a list generating unit configured to generate real-time video list data combining the plurality of sets of real-time video data generated by the trimming unit; and
a list distributing unit configured to distribute the real-time list data,
wherein the video data included in the real-time video list data may include information on a sampling time and an end time, and the list generating unit is further configured to generate a list sorted so as to give a lower priority to video data whose sampling time and end time have already passed.

2. The video distributing device according to claim 1, wherein the determining unit is further configured to determine that video content based on the video data for distribution is exciting when a number of times inputted information is supplied from viewer terminals that view the video content is equal to or greater than a predetermined threshold value.

3. The video distributing device according to claim 1, wherein the determining unit is further configured to determine that video content based on the video data for distribution is exciting when a number of viewer terminals that view the video content is equal to or greater than a predetermined threshold value.

4. The video distributing device according to claim 1 wherein the plurality of sets of real-time video data include at least one set of frame video data before and after a point in time at which video content was determined to be exciting by the determining unit.

5. The video distributing device according to claim 1, further comprising a third acquiring unit configured to acquire selection information for selecting video data included in the real-time video list data from the viewer terminal that views the listed video content based on the real-time video list data, wherein the distributing unit is further configured to distribute original video data for distribution based on the selection information to the viewer terminal that selected the video data included in the real-time video list data.

6. The video distributing device according to claim 1, further comprising a distribution control unit configured to set selection criteria for cruise destinations for a viewer terminal that requests use of a cruise service, and
a destination determining unit configured to determine video data for destinations based on the selection criteria from a plurality of sets of video data included in the real-time video list data, wherein
the list distributing unit is further configured to distribute the video data for destinations in successive order.

* * * * *